(12) United States Patent
Gilchrist et al.

(10) Patent No.: US 8,928,473 B2
(45) Date of Patent: Jan. 6, 2015

(54) FUEL MONITORING APPARATUS AND METHODS

(76) Inventors: James Wilson Gilchrist, Glasgow (GB); Ronald Thomas Meechan, Ayr (GB); Andrew Robert Meechan, Kilwinning (GB)

( * ) Notice: Subject to any disclaimer, the term of this patent is extended or adjusted under 35 U.S.C. 154(b) by 616 days.

(21) Appl. No.: 13/060,166

(22) PCT Filed: Aug. 24, 2009

(86) PCT No.: PCT/GB2009/051056
§ 371 (c)(1),
(2), (4) Date: Feb. 22, 2011

(87) PCT Pub. No.: WO2010/020821
PCT Pub. Date: Feb. 25, 2010

(65) Prior Publication Data
US 2011/0140877 A1    Jun. 16, 2011

(30) Foreign Application Priority Data

Aug. 22, 2008  (GB) .................................. 0815371.0
Jan. 13, 2009  (GB) .................................. 0900489.6

(51) Int. Cl.
| B60Q 1/00 | (2006.01) |
| B60K 15/04 | (2006.01) |
| G01F 23/00 | (2006.01) |
| G07C 5/00 | (2006.01) |
| B60K 15/03 | (2006.01) |

(52) U.S. Cl.
CPC ............ B60K 15/04 (2013.01); G01F 23/0076 (2013.01); G07C 5/008 (2013.01); B60K 2015/03434 (2013.01)
USPC ................. 340/450.2; 340/539.1; 340/239.11; 340/425.5; 340/426.1; 340/438

(58) Field of Classification Search
USPC ........... 340/539.1, 539.11, 425.5, 426.1, 438, 340/933; 701/29.6, 32.5, 32.6; 705/28
See application file for complete search history.

(56) References Cited

U.S. PATENT DOCUMENTS 6,240,365 B1    5/2001  Bunn
6,898,493 B2 *  5/2005  Ehrman et al. ............... 701/29.6
(Continued)

FOREIGN PATENT DOCUMENTS

CN  201229599  4/2009
EP  1785389  5/2007
(Continued)

OTHER PUBLICATIONS

International Search Report for PCT/GB2009/051056, mailed Apr. 20, 2010.
(Continued)

*Primary Examiner* — Daryl Pope
(74) *Attorney, Agent, or Firm* — Nixon & Vanderhye PC

(57) ABSTRACT

A fuel monitoring device for a vehicle having one or more fuel tank sensors, the fuel monitoring device comprising a control module in communication with the or each fuel tank sensor, wherein the control module is operable to receive data from the or each fuel tank sensor and operable to output fuel level related data to a mobile communications system transmitter for transmission to an end user. The fuel monitoring device may be installed covertly within a vehicle and communicate with the vehicle's fuel tank sensor and, optionally, further sensors. The fuel monitoring device facilitates the transmission of information to an end user allowing the end user to identify occurrences of fuel theft from a remote location and/or the fuel monitoring device is operable to generate an alarm condition in or in the proximity of the vehicle. Data may additionally be audited to identify opportunities to improve operating efficiency of a vehicle, or a fleet of vehicles, or to provide early warning of possible vehicle faults and/or to identify fuel theft.

24 Claims, 3 Drawing Sheets

(56) References Cited

U.S. PATENT DOCUMENTS

| | | | |
|---|---|---|---|
| 6,957,133 B1 | 10/2005 | Hunt et al. | |
| 7,024,317 B1* | 4/2006 | George | 702/45 |
| 7,760,085 B2* | 7/2010 | Lertora et al. | 340/539.31 |
| 2001/0037298 A1* | 11/2001 | Ehrman et al. | 705/40 |
| 2006/0111851 A1* | 5/2006 | Potgieter et al. | 702/35 |
| 2006/0196571 A1 | 9/2006 | Kassner | |
| 2007/0079804 A1 | 4/2007 | Nakayama | |
| 2008/0142097 A1* | 6/2008 | Rumpf | 137/565.23 |
| 2009/0099724 A1* | 4/2009 | Kranz et al. | 701/35 |

FOREIGN PATENT DOCUMENTS

| | | |
|---|---|---|
| GB | 2338308 | 12/1999 |
| GB | 2433999 | 7/2007 |
| WO | WO 2004/007344 | 1/2004 |
| WO | WO 2008/146307 | 12/2008 |

OTHER PUBLICATIONS

Written Opinion of the International Searching Authority for PCT/GB2009/051056, mailed Apr. 20, 2010.

* cited by examiner

FUEL MONITORING APPARATUS AND METHODS

This application is the U.S. national phase of International Application No. PCT/GB2009/051056 filed 24 Aug. 2009, which designated the U.S. and claims priority to GB Application No. 0815371.0 filed 22 Aug. 2008 and GB Application No. 0900489.6 filed 13 Jan. 2009, the entire contents of each of which are hereby incorporated by reference.

FIELD OF THE INVENTION

The invention relates to the field of vehicle fuel level monitoring.

BACKGROUND TO THE INVENTION

Vehicle fuel, such as diesel or petrol, is increasingly subject to theft due to increases in retail costs. Fuel theft is particularly problematic for the transport industry, due to costs of the fuel itself and due to loss of productivity.

Fuel theft can take a number of forms. Commonly, fuel theft is committed by siphoning fuel from a vehicle's tanks. This form of fuel theft may take place from either private vehicles or from commercial vehicles, but is most prevalent from commercial vehicles due to the comparably large capacity of their fuel tanks. In addition, small amounts of fuel siphoned from large capacity tanks may not have an obvious effect on the fuel level reading within the vehicle cockpit, and so fuel theft, or the location and time of fuel theft, may remain undetected.

In some cases, fuel theft is hidden by the addition of water to the fuel tank to replace stolen fuel. A vehicle fuel tank sensor reflects the total volume of liquid present in the tank and therefore does not immediately alert the driver or owner of the vehicle that a significant theft has occurred. In addition, water is immiscible with the fuel in the tank and therefore the vehicle continues to operate normally for a period of time, until sufficient water is delivered to the vehicle's engine to affect its operation, again making the time and location of the theft difficult to determine.

Alternatively, fuel may be introduced into portable tanks for later use or re-sale, during re-filling of a commercial or fleet vehicle and the cost fraudulently included in the much larger cost of refuelling the vehicle.

Various devices for the detection of fuel theft have been proposed. Anti-siphoning devices have been proposed for insertion into the necks of vehicle fuel tanks. Such devices cannot, however, prevent fuel from being intercepted at alternate points in the fuel system, for example by removal of a fuel tank drain plug, or temporary disconnection of a fuel line, or by methods resulting in permanent damage to the vehicle. Anti-siphon devices may therefore also encourage fuel theft by methods resulting in permanent damage to the vehicle, such that the costs incurred due to the permanent damage and down time of the vehicle exceed the cost of the fuel itself. Anti-siphon devices are also unable to prevent the other forms of fuel theft discussed above.

Devices have been proposed to directly monitor fuel tank levels over time and raise an alarm when an unexpected change of fuel has been recorded. Devices of this type require sensors to be installed within the fuel tank and wiring for the system to be installed throughout the vehicle. In addition to the cost and complexity of fitting systems of this type, it is difficult for them to remain undetected by a person familiar with the technology. Additionally, it is possible to avoid triggering such devices by removing fuel at one point in the system (for example from a fuel line) at a similar rate to which water is introduced elsewhere (for example through the neck of the fuel tank).

Fuel theft by fraudulently filling separate fuel cans, as described above, cannot be detected by any existing devices installed upon vehicles. Such behaviour may presently only be detected when it is so blatant as to become apparent from detailed comparison of miles travelled and volume of fuel purchased, or if an individual's fraudulent behaviour is directly observed. Since an individual may use, and may commit fuel theft from, a number of vehicles within a fleet, their behaviour may go unnoticed indefinitely.

Therefore, there remains a need for devices or systems for the detection of fuel theft capable of more effectively detecting fuel theft.

SUMMARY OF THE INVENTION

According to a first aspect of the present invention there is provided a fuel monitoring device for a vehicle having one or more fuel tank sensors, the fuel monitoring device comprising a control module in communication with the or each fuel tank sensor, wherein the control module is operable to receive data from the or each vehicle fuel tank sensor, and operable to output fuel level related data to a mobile communications system transmitter for transmission to an end user.

A fuel monitoring device in communication with the or each vehicle fuel tank sensor is operable to transmit fuel level related data to an end user. This enables the end user to remotely monitor fuel levels, and identify potential occurrences of fuel theft.

In some embodiments, data received by the control module from the or each fuel tank sensor comprises data received by the control module directly from the or each fuel tank sensor, for example by way of a wired connection.

A control module in direct communication with the or each fuel tank sensor is operable to receive data directly from the or each fuel tank sensor regardless of the status of any of the electrical systems of the vehicle, for example the vehicle ignition system or the controlled area network (CAN).

Typically, a vehicle fuel tank sensor is connected to a fuel gauge by a wired connection, and may be in communication with the vehicle fuel gauge across the CAN, the fuel gauge being in wired connection with the CAN.

Preferably the control module receives data directly from the or each fuel tank sensor by way of a wired connection which is connected in parallel to any wired connection, or connections between the fuel tank sensor and the CAN, or vehicle fuel gauge.

Typically, data received by the control module directly from the or each fuel tank sensor is analogue data. Data received by the control module directly from the or each fuel tank sensor may comprise measurement of resistance, or voltage.

The fuel tank sensor may comprise a passive electrical component having one or more properties which vary with fuel level. The control module may receive data directly from the or each fuel tank sensor by measuring the one or more properties.

Fuel tank sensors in common use typically comprise a potentiometer, wherein the fluid level within the tank is correlated with voltage at the output of a potentiometer. Fuel tank sensors comprising variable resistors, wherein the fluid level within the tank is correlated with the resistance of the variable resistor, are also in common use. For example, a fuel tank sensor may comprise a float (said float being buoyant in fluid within the fuel tank) slideably positioned on a rail or located at the end of a moveable armature, and the resistance of a variable resistor, or the voltage at the output of a potentiometer, may be determined by the position of the float and thus the level of fluid within the fuel tank.

Preferably the fuel monitoring device is configured with the settings of a plurality of fuel tank sensors. A limited number of fuel tank sensors are in common usage, particularly within a certain class of vehicle, such as heavy goods vehicles, and the fuel monitoring device is advantageously configured with the calibration settings of a number of fuel tank sensors in common usage, thus enabling the device to be switched to a precalibrated setting appropriate to the type of fuel tank sensor in use in the vehicle to which the fuel monitoring device is installed.

Preferably, the fuel monitoring device is operable when the ignition system (of a vehicle having an ignition system) is off and/or powered up and/or partially powered up. Preferably, the fuel monitoring device is operable when the or each battery (of a vehicle having at least one battery) is connected and/or disconnected and/or charged and/or partially charged and/or discharged.

Fuel theft events typically occur when the vehicle ignition and/or the engine are shut down, for example during refuelling of the vehicle. It is therefore advantageous for a fuel monitoring device to be operable to enable an end user to identify potential fuel theft events independently of the vehicle ignition system status. Fuel theft events also commonly include disconnection or tampering with the connections of a (or each) vehicle battery, for example in order to disable a vehicle alarm system. Therefore, it is also advantageous for a fuel monitoring device to be operable to enable an end user to identify potential fuel theft events independently of the vehicle battery status.

In some embodiments the fuel monitoring device is in communication with the or each battery, and may be operable in some configurations to draw power from the or each battery.

A fuel monitoring device in communication with the or each battery is operable to detect tampering with the connections to the or each battery. Information relating to the connections to the or each battery may then be transmitted, together with fuel level related data, to an end user.

In some embodiments, the fuel monitoring device is in communication with one or more further sensors. Preferably the vehicle is in direct communication (for example by a wired connection) with one or more further sensors. Preferably the fuel monitoring device is in communication (for example by a direct, wired connection) with the vehicle speed sensor. The monitoring device may include an interface for receiving speed pulses from a speed monitoring device of the vehicle. The said speed pulses may be indicative that the vehicle is moving.

Connection to a vehicle speed sensor enables the fuel monitoring device to detect whether or not the vehicle is moving and to thereby distinguish between changes in fuel level related data resulting from normal operation of the vehicle and a fuel theft condition.

In some embodiments, the mobile communication systems transmitter functions as a transceiver. Preferably the fuel monitoring device is operable to immobilise the vehicle if an alarm condition or a fuel theft condition is detected. In some embodiments, the control module is in communication (which may be direct, wired communication) with the vehicle ignition system and/or the vehicle battery supply and is operable to deactivate the vehicle ignition system, or the vehicle power supply, and thereby immobilise the vehicle. In some embodiments, the fuel monitoring device is operable to immobilise the vehicle in response to a signal received from an end user.

Preferably, for a vehicle having a Controlled Area Network (CAN) wherein the one or more fuel tank sensors are in communication with the CAN, the control module is operable to receive data from the or each vehicle fuel tank sensor across the CAN.

Connection of the fuel monitoring device to a vehicle's existing CAN requires no special connections. A CAN is now standard in all vehicles and connects sensors throughout the vehicle to gauges and other human interface devices within the cockpit of the vehicle, and/or to electronic control devices within the vehicle, such as the fuel system and the ignition.

Thus, a fuel monitoring device connected to a vehicle's CAN is able to receive information from other devices connected to the CAN, such as the vehicle's fuel tank sensor and therefore obviates the requirement for additional fuel level sensors to be installed. Furthermore, since the CAN extends throughout a vehicle, the monitoring device may be installed covertly, and in one of a number of positions, thereby greatly decreasing the possibility of detection of the device.

Preferably, the control module is operable to either receive data directly from the or each fuel tank sensor and/or from the or each fuel tank sensor across the CAN.

In some embodiments, the fuel monitoring device is operable to receive data from the or each fuel tank sensor across the CAN, when the CAN is activated, and operable to receive data directly from the fuel tank sensor, when the CAN is deactivated.

Preferably, the data received from the or each fuel tank sensor across the CAN is used to calibrate data received directly from each said fuel tank sensor. Connection of the control module to both the CAN and directly to the or each fuel tank sensor enables the fuel monitoring device to correlate data received from the or each fuel tank sensor across the CAN with data received directly from each said fuel tank sensor, and thereby self-calibrate the data received directly from each said fuel tank sensor.

Typically, data received from the or each fuel tank sensor across the CAN is calibrated fuel level related data. In some embodiments, data received from the or each fuel tank sensor is digitized and/or calibrated by one or more data processing devices (such as analogue to digital converters) intermediate the fuel tank sensor and the CAN. Alternatively or in addition, data may be received from the or each fuel tank sensor across the CAN via one or more electronic control units which are in communication with the CAN.

In some embodiments, the control module is operable to receive a signal from the or each fuel tank sensor in a first ignition system status and in a second ignition system status, wherein, in the first ignition system status, the control module is operable to receive calibrated data (such as calibrated digital fuel level related data) from the or each fuel tank sensor across the CAN via one or more data processing devices and/or one or more electronic control units, and in the second ignition system status, the control module is operable to receive uncalibrated data from the or each fuel tank sensor and not operable to receive calibrated data from the or each fuel tank sensor across the CAN via one or more data processing devices and/or one or more electronic control units.

Preferably, the control module is operable to calibrate data received from the or each fuel tank sensor in the second ignition system status using data received from the or each fuel tank sensor in the first ignition system status.

In some embodiments, the fuel monitoring device is operable to receive location data from a vehicle location system, and operable to output fuel level related data and location data to a mobile communications system transmitter for transmission to an end user.

Direct correlation of vehicle fuel level information with vehicle position and velocity information facilitates the transmission of real-time information to an end user allowing the end user to identify occurrences of fuel theft and the location of the event within a minimal time from the event taking place.

The end user may be the owner, lessee, lessor or operator of the vehicle, an owner who manages a fleet of vehicles or a fleet manager responsible for a fleet of vehicles, or a member of the public. The end user may be the police or other enforcement agency. In some embodiments, information is transmitted to more than one end user.

The information may be sent to any suitable device or a plurality of devices, such as a computer terminal, or a mobile phone.

The vehicle location system is preferably a satellite positioning system receiver, for example GPS receiver. The fuel monitoring device may further comprise a vehicle location system, integral to the fuel monitoring device and in electronic communication with the control module. Alternatively, the fuel monitoring device may be operable to receive location data from a separate vehicle location system, for example a vehicle location system integral to a vehicle satellite navigation system, across the CAN.

The fuel monitoring device may further comprise a mobile communication system transmitter, integral to the fuel monitoring device. Preferably the mobile communications system transmitter is a GSM transmitter. Most preferably, the mobile communications system transmitter is a transceiver, for example a GSM transceiver.

Alternatively, the fuel monitoring device may be operable to transmit the output data to a separate mobile communications system transmitter, for example across the CAN.

In some embodiments, the vehicle location system and mobile communications system transmitter are integral to a vehicle alarm system module, and the control module is operable to communicate with an electronic interface of the vehicle alarm system, to receive location data and to output fuel level related data by means of the vehicle location system and mobile communication system transmitter which are integral to the vehicle alarm system. The vehicle location system may communicate with the vehicle alarm system by, for example, a direct wired connection or across the CAN.

The fuel level related data may comprise fuel level data received from the vehicle fuel tank sensor. The fuel level related data may comprise data derived from the received fuel level data, for example quantitative or qualitative data representative of a change in the received fuel level. The fuel level related data may comprise data indicative that a fuel level related event has occurred. For example, the fuel level related data may comprise data indicative that a fuel monitoring device had determined from data including the received fuel level data, that a fuel theft event has, or may have, occurred.

The control module may receive data from one or more further sensors across the CAN and transmit information from one or more further sensors to an end user via the mobile communications system transmitter. Preferably the control module receives data from the vehicle octane sensor across the CAN.

Most modern vehicles are equipped with fuel octane sensors to enable the appropriate regulation of the fuel/air mixture delivered to the engine. Addition of water to a fuel tank causes abnormal fluctuations in readings from the octane sensor.

Therefore, correlation of fuel level information, vehicle position and velocity information and fuel octane level enables the identification of fuel theft events comprising the addition of water to a fuel tank.

The control module may receive data from the vehicle odometer and the fuel level related data may additionally comprise mileage data associated with fuel level at a given time.

It is increasingly common for modern vehicles to be equipped with additional sensors located within the or each fuel tank. In some embodiments, the control module of the fuel monitoring device is operable to receive data from one or more further sensors located in the or each fuel tank. Data may be received across the CAN, or data may be received directly from the one or more further sensors, or alternatively the control module may be operable to receive data both directly and across the CAN, depending on whether the CAN is activated or deactivated.

Preferably, the control module is operable to receive data from one or more urea sensors located in the or each fuel tank.

Preferably, the fuel monitoring device comprises an uninterruptible power supply. The uninterruptible power supply may be integral to the fuel monitoring device, or connected to the fuel monitoring device. For example, the fuel monitoring device may be in communication with an alarm system comprising an uninterruptible power supply and operable to draw energy from the uninterruptible power supply of the alarm system.

Commonly, thieves and in particular fuel thieves will disconnect a vehicle's battery in an attempt to disable known fuel monitoring systems. The provision of an uninterruptible power supply enables the fuel monitoring system to continue to collect and transmit information in the event that the vehicle's battery is disconnected, including information that the vehicle's battery has been disconnected.

Most preferably, the fuel monitoring device for a vehicle further comprises a processing module in communication with the control module, wherein the processing module processes information received by the control module and creates an alarm condition if a fuel theft condition is met.

Preferably, the processing module is operable to determine time averaged fuel level related data and thereby distinguish between variations with fuel level related data over time resulting from motion, rocking or vibrations of the vehicle and a fuel theft condition.

Alternatively, or in addition, the fuel monitoring device may comprise a tilt sensor in communication with the control module, wherein the tilt sensor is operable to transmit vehicle orientation data to the control module. Preferably, the processing module is operable to process information received by the control module from each said fuel tank sensor and the tilt sensor, and thereby distinguish between variations in fuel level related data resulting from changes in vehicle orientation and a fuel theft condition.

The processing module may be a microprocessor or microcontroller executing stored program code.

Preferably the control module is operable to output an alarm signal in response to an alarm condition of the processing module. The alarm signal may comprise an audible alarm signal and/or a visual alarm signal. The alarm signal may be issued within and/or in the proximity of the vehicle. In some embodiments the control module is operable to output the alarm signal to a mobile communications system transmitter for transmission to an end user. The control module may alternatively, or in addition, be operable to immobilise the vehicle in response to alarm condition of the processing module. The vehicle may be immobilised by sending an instruction to the vehicle ignition across the CAN, or to cause immobilisation of the vehicle by any other suitable immobilisation means.

In some embodiments, the vehicle comprises an alarm system module, and the control module is operable to output the alarm signal to the vehicle alarm system module.

In some embodiments the fuel monitoring device comprises an alarm system module, which may be located in the vehicle proximal to, or remotely from, the control module. For example, the control module and, optionally, the mobile communications system transmitter and, where present, the processing module are typically covertly located in or on the vehicle and the alarm system module (of the vehicle, or the fuel monitoring device, as the case may be) is located in the engine bay of the vehicle. In some embodiments, the vehicle alarm system module comprises a mobile communications system transmitter, and the control module is operable to output an alarm signal to the vehicle alarm signal module for transmission to an end user via the mobile communications system transmitter of the alarm signal module.

In some embodiments, the alarm system module comprises an uninterruptible power supply. In some embodiments, the alarm system module is operable to issue an alarm if a vehicle battery is disconnected. In some embodiments, the control module is operable to draw power from an uninterruptible power supply of the alarm system module. In some embodiments, the control module and the alarm system module have independent interruptible power supplies.

The alarm system module may be operable to signal an alarm within and/or proximal to the vehicle. Preferably the alarm system module comprises audible alarm means, such as a siren and in some embodiments the alarm system module is connected to the vehicle horn and is operable to sound the vehicle horn. In some embodiments, the alarm module is connected (for example by a wired connection) to the vehicle lighting control unit and is operable to cause the vehicle lights to flash. Typically, vehicle indicators are provided with a hazard mode, wherein indicators on all sides flash simultaneously. In some embodiments the alarm system module is operable to cause the vehicle indicators to enter a hazard mode.

In some embodiments, the alarm system module may be remotely activated and/or deactivated. The alarm system module may comprise a wireless transceiver. In some embodiments wherein the mobile communication systems transmitter functions as a transceiver, the alarm system module is operable in response to signals received by the mobile communications system transceiver. Preferably the alarm system further comprises a panic mode and may be activated, and preferably wirelessly activated, in an emergency by the vehicle operator, for example by pressing a button on a key fob, or pressing a button within the vehicle.

In some embodiments, the alarm system module (which may comprise an audible alarm means) is connected to the vehicle battery. In some embodiments, the alarm system module comprises an uninterruptible power supply.

It is known for thieves to attempt to deactivate vehicle alarm systems and other security devices prior to committing fuel theft. An alarm system module operable to be powered independently from the control module, or the vehicle battery, by an uninterruptible power supply, may create and audible or visual alarm signal, or transmit an alarm signal to an end user, in the event that the vehicle power supply, or the control unit, is tampered with.

Preferably the control module is operable to immobilise the vehicle and/or transmit an alarm to the occupant of the vehicle, and/or transmit an alarm to a further end user in response to a signal received by the mobile communications system transceiver from an end user.

The fuel monitoring device may be installed during construction of the vehicle, or the fuel monitoring device may be retrofitted to a vehicle.

Preferably the monitoring device further comprises a data logging module which records data received by the control module over time. The data logging module may comprise a computer readable carrier such as a PROM, EPROM or EEPROM. In a preferred embodiment the fuel monitoring device comprising a data logging module is operable to calculate cumulative fuel level changes.

Calculation of cumulative fuel level changes may be compared to claimed fuel purchases for a vehicle in which a fuel level monitor is installed, and thereby facilitate detection of fuel theft by the filling of separate fuel tanks during refuelling of the vehicle.

Advantageously, a preferred embodiment of the fuel level monitoring device according to the present invention is operable to monitor fuel level related data in "real-time" by receiving and recording fuel level related data at regular time intervals (for example every minute, or every 10 seconds, or every second or at any regular interval of time). Such real-time data may subsequently enable a fuel audit to be conducted for a vehicle in which a fuel monitoring device has been installed. A fuel audit facilitates the detection of fuel level events, for example fuel theft, and further vehicle related information, for example fuel consumption for certain journeys, or when driven by certain drivers, and/or changes in fuel consumption over time which may indicate required vehicle maintenance.

Preferably, the fuel monitoring device is operable to output fuel level related data to a mobile communications system transmitter for wireless transmission to a fuel dispensing pump. Preferably the fuel level related data further comprises vehicle mileage data, such as an odometer reading.

It is known for fuel dispensing pumps at vehicle filling stations to comprise a control system for metering the quantity of fuel dispensed and, typically, payment systems to enable a vehicle operator to refuel a vehicle and pay for the fuel without leaving the vicinity of a vehicle. It is also known, for example for vehicle fleets, to employ payment systems such as prepaid accounts or business accounts.

A fuel monitoring device operable to communicate wirelessly with a fuel dispensing pump enables activation of the fuel pump without further user intervention. Furthermore, in embodiments wherein the fuel level related data comprises mileage data, fuel auditing is enabled. For example, vehicle mileage may be correlated with total amount of fuel dispensed over a period of time, and fuel theft or high vehicle fuel consumption thereby identified.

In some embodiments, the fuel level related data comprises available fuel tank capacity. Thus, the maximum amount of fuel to be dispensed by the fuel dispensing pump may be limited to the available fuel tank capacity, so as to prevent over filling of the fuel tank or filling of another vessel.

Spillage of fuel from fuel tank overflows is a known problem and results in water contamination, degraded road surfaces and hazardously slippery roads. Such spillage typically results from over filling of vehicle fuel tanks by vehicle operators in an effort to introduce more fuel to the tank and reduce the required frequency of stops to refuel.

In some embodiments, the fuel monitoring device is operable to raise an audible alarm signal in the vicinity of the vehicle when a volume of fuel is dispensed, or attempted to be dispensed, which exceeds the available capacity of the vehicle fuel tank.

Thus, the invention also extends to a fuel dispensing pump operable to communicate wirelessly with a fuel monitoring device located within a vehicle to receive fuel level related data concerning the vehicle. Typically the fuel monitoring device is a fuel monitoring device according to the first aspect of the invention. Preferably the fuel dispensing pump comprises a control system for metering the quantity of fuel dispensed. In embodiments wherein the fuel level related data comprises available fuel tank capacity, the fuel dispensing pump is advantageously operable to stop dispensing fuel when a volume of fuel in excess of the available fuel tank capacity has been dispensed.

In some embodiments, the fuel dispensing pump comprises a payment system.

In some embodiments, the fuel level related data may meet a fuel theft condition and/or an alarm condition. Preferably, the fuel dispensing pump is operable to prevent fuel from being dispensed in response to a fuel theft condition and/or an alarm condition of the fuel monitoring device.

According to a second aspect of the present invention there is provided a vehicle having a fuel tank sensor, comprising a fuel monitoring device according to the first aspect of the present invention.

Preferably the vehicle comprises a vehicle navigation system having a satellite positioning system receiver, wherein the satellite positioning system receiver is in communication with the control module of the fuel monitoring device across a CAN.

Preferably the vehicle comprises a mobile communications system transmitter, wherein the mobile communications system transmitter is in communication with the control module of the fuel monitoring device across a CAN.

In some embodiments, the vehicle comprises a vehicle alarm system module, wherein the alarm system module comprises a vehicle location system and a mobile communications system transmitter, wherein the control module is operable to communicate with an electronic interface of the vehicle alarm system to receive location data and to output fuel level related data by means of the vehicle location system and mobile communications system transmitter of the vehicle alarm system.

Further preferred and optional features of the fuel monitoring device of the first aspect correspond to preferred and optional features of the fuel monitoring device of the vehicle of the second aspect.

According to a third aspect of the present invention there is provided a fuel monitoring system comprising one or more fuel monitoring devices according to the first aspect of the present invention, or one or more vehicles according to the second aspect of the present invention, and a central processing module operable to receive vehicle-specific data from the one or more fuel monitoring devices across a mobile communications network, wherein the central processing module processes vehicle-specific data received from the one or more fuel monitoring devices and creates a vehicle-specific alarm condition if a fuel theft condition is met.

The central processing module may be a microprocessor or microcontroller executing stored program code.

Preferably the mobile communications system transmitter of each said fuel monitoring device of the fuel monitoring system is a transceiver, and the central processing module is operable to transmit a vehicle-specific signal to a predetermined fuel monitoring device across a mobile communications network. One or more of the fuel monitoring devices may be operable to transmit an alarm signal to an occupant of a vehicle and/or immobilise a vehicle in response to a signal received from the central processing module.

The fuel monitoring system may comprise a central data logging module which records vehicle-specific data received from the or each fuel monitoring device at regular time intervals, wherein the central processing module is operable to calculate vehicle-specific cumulative fuel level changes and/or to conduct a vehicle-specific fuel audit.

Calculation of cumulative fuel level changes for each vehicle, for example for each vehicle within a fleet of vehicles each having a fuel monitoring device, may be compared to claimed fuel purchases for each vehicle in which a fuel level monitor is installed, and thereby facilitate detection of fuel theft by the filling of separate fuel tanks during refuelling of the vehicle.

In some embodiments, the central processing module is operable to communicate with a fuel dispensing pump, or the payment system of a fuel dispensing pump. For example, an automated fuel billing system may comprise the central processing module. Preferably the fuel level related data is vehicle-specific fuel level related data. Preferably the fuel level related data further comprises vehicle-specific mileage data, such as an odometer reading. Thus, in embodiments of the fuel monitoring system comprising a plurality of fuel monitoring devices, typically installed on a plurality of vehicles, fuel level related data may be uniquely attributed to a specific vehicle, and fuel auditing of each of a plurality of vehicles is thereby enabled.

According to a fourth aspect of the present invention there is provided a method of detecting fuel theft, comprising the steps of monitoring the fuel level of a vehicle by taking readings from the or each fuel tank sensor of the vehicle and comparing data related to the fuel level of the vehicle against one or more fuel theft conditions.

Preferably, the method comprises the further steps of monitoring the position and/or velocity of the vehicle using a vehicle location system, and comparing data related to the position and/or velocity of the vehicle and data related to the fuel level of the vehicle against one or more fuel theft conditions.

In some embodiments, the method comprises the step of monitoring the fuel level of a vehicle taking readings from the or each fuel tank sensor across the CAN of the vehicle. Optionally, the method comprises step of monitoring one or more further vehicle sensors and comparing some or all data against one or more fuel theft conditions. The one or more further vehicle sensors may be monitored directly and/or across the CAN.

The method may comprise the step of transmitting information to an end user across a mobile communications network.

Advantageously, the method comprises the further step of recording total changes in fuel levels for comparison with recorded fuel purchases, thereby facilitating the detection of fuel theft by the filling of separate fuel tanks during refuelling of the vehicle.

The control module of the fuel monitoring device according to the first aspect of the present invention, or the control module of the fuel monitoring device of the vehicle according to the second aspect of the present invention, or the control module of the fuel monitoring device of the fuel monitoring system of the third aspect of the present invention, may be an electronic control unit, or a computer processor. Alternatively or additionally, the control module may comprise a computing device, such as a microprocessor or microcontroller, executing computer program code. Thus, the invention extends to program code which, when executed on a computing device, causes the computing device to function as a control module. The program code is typically stored on a computer readable carrier, such as a PROM, EPROM or EEPROM.

The processing module of the fuel monitoring device according to the first aspect of the present invention, or the processing module of the fuel monitoring device of the vehicle according to the second aspect of the present invention, or the processing module of the fuel monitoring device of the fuel monitoring system of the third aspect of the present invention, or the central processing module of the fuel monitoring device according to the third aspect of the present invention, may be an electronic processing unit, or a computer processor. Alternatively or additionally, the control module may comprise a computing device, such as a microprocessor or microcontroller, executing computer program code. Thus, the invention extends to program code which, when executed on a computing device, causes the computing device to function as a control module. The program code is typically stored on a computer readable carrier, such as a PROM, EPROM or EEPROM.

Preferably, the fuel theft conditions, and/or the alarm conditions of the present invention comprise one or more of; a rapid decrease in fuel level when the vehicle is stationary; a decrease in fuel level when the engine is switched off; an increase in fuel level when the octane level decreases; a rapid change in fuel composition; a loss of direct communication between the control module and a sensor; a loss of direct communication between the control module and the or each fuel tank sensor; a loss of communication between the control module and the CAN, when the CAN is activated or between successive periods when the CAN is active; a loss of communication between the control module and a sensor across the CAN, when the CAN is activated or between successive periods when the CAN is activated; a loss of communication between the control module and the or each battery; and a decrease in fuel level between successive periods when the CAN is active; dispensing of a volume of fuel in excess of the available capacity of the fuel tank, as calculated from fuel level related data; attempting to dispense a volume of fuel in excess of the available capacity of the fuel tank, as calculated from fuel level related data.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
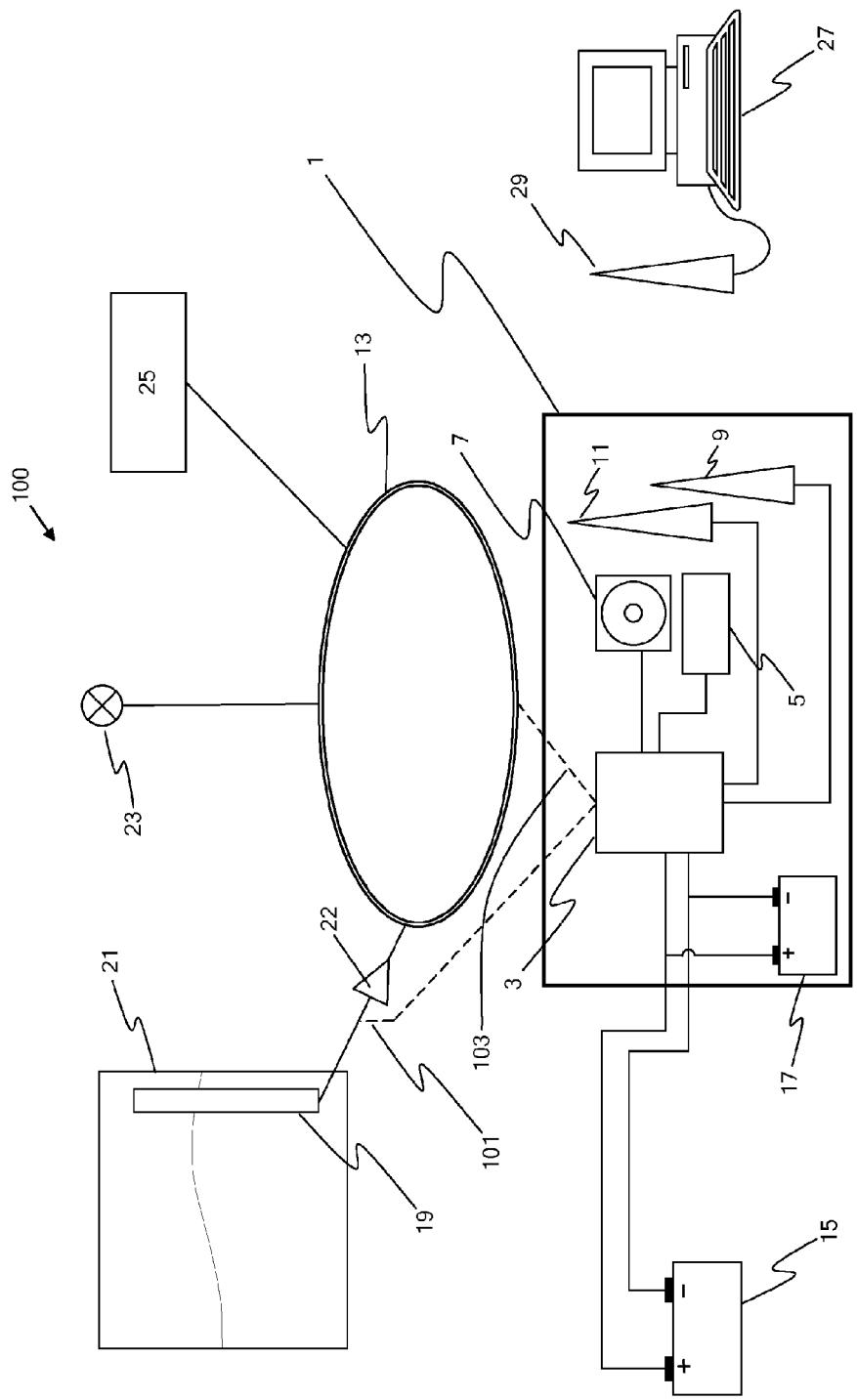
FIG. 1 is a schematic diagram of a fuel monitoring device according to the present invention.

FIG. 1 schematically depicts a fuel monitoring device 1, comprising a control module 3 connected to a processor 5, a flash memory device 7, a GPS receiver 9 and a GSM transceiver 11. The fuel monitoring device is suitable to be installed covertly within a vehicle (shown generally by the numeral 100) and connected to the vehicle's fuel tank sensor 19 within the vehicle's fuel tank 21, directly via connection 101 and 102, and to the vehicle's Controlled Area Network 13 (abbreviated to CAN or CAN-bus) by connection 103, via data processing device 22. The data processing device processes data received from the fuel tank sensor into a digital data format suitable to be transmitted across the CAN, and additionally calibrates the data received from the fuel tank sensor. In an alternative embodiment (not shown) the data processing device digitizes the data, relays the data across the CAN to an electronic control unit in communication with the CAN, and the data is calibrated and/or further processed by the electronic control unit. The data is then relayed by the electronic control unit to the control module across the CAN. The fuel monitoring device draws power from the vehicle's battery 15 and, in the event that the battery is disconnected, from an uninterruptible power supply 17, such as a rechargeable backup battery. The uninterruptible power supply may be integral to the fuel monitoring device, as shown in FIG. 1, or alternatively the fuel monitoring device may be connected to an external uninterruptible power supply installed on the vehicle, for example an uninterruptible power supply of a vehicle alarm system (not shown).

The control module is operable to send and receive data across the CAN. In particular, the control module is operable to receive information from the fuel sensor across the CAN. The control module is also operable to receive data directly from the fuel tank sensor. In preferred embodiments, the control module is also operable to receive information from other devices connected to the CAN, such as an octane sensor 23 and the vehicle ignition 25, and directly (and across the CAN), from other sensors located in the fuel tank.

Typically, data received across the CAN is digital data and data received directly from the fuel tank sensor (and optionally additional sensors) is analogue data. In a preferred embodiment, the analogue data comprises measurements of the voltage at the output of a potentiometer within the fuel tank sensor.

The CAN of most modern vehicles is activated when the vehicle ignition system is activated, and deactivated, or partially deactivated when the vehicle ignition system is partially or fully deactivated.

Figure 2:
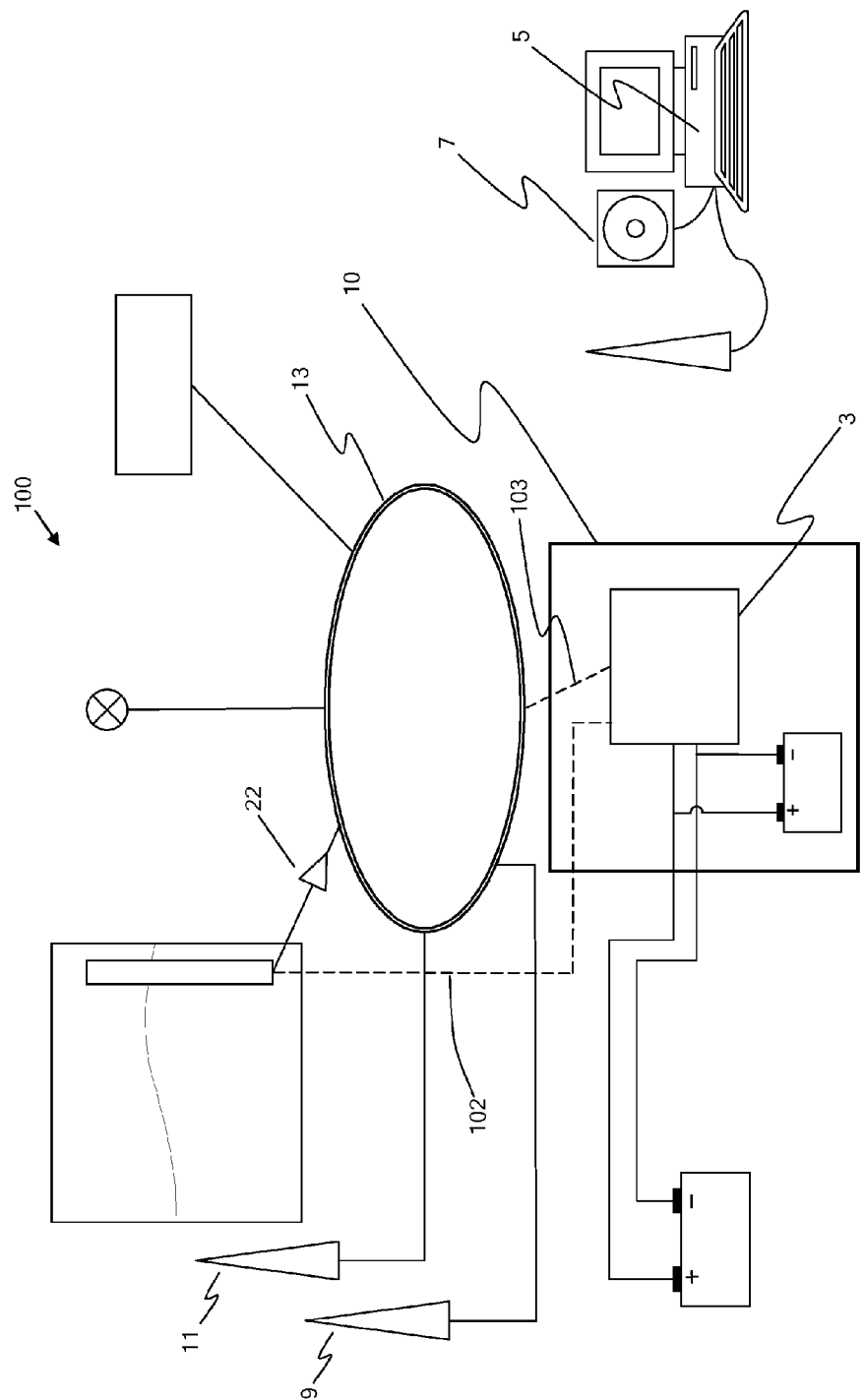
FIG. 2 is a schematic diagram of an alternative fuel monitoring device according to the present invention.

The fuel monitoring device of the present invention is advantageously operable to receive digital data across the CAN when the CAN is activated, and operable to receive analogue data from the fuel tank sensor when the CAN is partially or fully deactivated. This is depicted in FIGS. 1 and 2 by dotted lines 101, 102 and 103. The direct connection between the fuel monitoring device and the fuel tank sensor may be established at any point between the fuel tank sensor and the data processing device, as shown by lines 102 and 103 in FIGS. 1 and 2, respectively. Data acquired across the CAN is used to calibrate the voltage data received directly from the fuel tank sensor, thereby enabling the fuel monitoring device of the present invention to self-calibrate. In alternative embodiments, the fuel monitoring device is operable to activate or partially activate the CAN in order to receive data across the CAN, regardless of the status of the vehicle ignition system or the vehicle battery. In further embodiments, the fuel monitoring device is operable to activate one or more further sensors and receive data directly from one or more further sensors, regardless of the status of the vehicle ignition system, CAN and/or battery.

Although most vehicle fuel tank sensors function according to similar parameters, fuel tank capacity and the correlation between fuel level and fuel tank sensor readings can vary from vehicle to vehicle. A self calibrating fuel monitoring device need not be adjusted, following installation, in order to be suitable for a particular vehicle (although pre-programmed calibrations for known vehicle types is also contemplated) and therefore mis-calibrations leading to spurious alarm conditions (discussed below) are avoided.

In use, the control module receives data at regular time intervals from the fuel tank sensor, the GPS receiver and other devices such as the octane sensor and ignition. This information is processed by the processor and raw data and/or processed data is recorded on the flash memory device. The processor is programmed to recognise a number of fuel theft conditions.

The following are examples of fuel theft conditions:
(1) If the fuel sensor records a drop in fuel level when the GPS data indicates that the vehicle is stationary and the ignition status indicates that the engine is not running.
(2) If the fuel sensor records a drop in fuel level above a predetermined threshold when the GPS data indicates that the vehicle is stationary and the ignition status indicates that the engine is running.
(3) If the fuel sensor records a change in fuel level and either a simultaneous or later fall in octane level.
(4) The octane sensor records a fall in octane level exceeding a predetermined threshold.
(5) A change in power supply to the control module is recorded.

Changes in the fuel level might be determined from fuel level data received over the CAN, when the CAN is activated, or from the calibrated analogue data received directly from the fuel tank sensor, and calibrated by the fuel monitoring device, when data cannot be received in digital form across the CAN.

Further fuel theft conditions can be recognised from data received directly from the fuel tank sensor or, optionally, other sensors located in the fuel tank. Fuel theft may comprise disconnection of certain of the vehicle's electronic systems, such as the ignition system, battery and/or the alarm system, prior to removal of fuel from the tank.

A fuel monitoring device having an uninterruptible power supply, in communication with the vehicle fuel tank sensor at all times, is operable to detect a decrease in fuel level when the CAN is deactivated. In addition, the device is able to detect changes in the connection between the vehicle electrical systems and the vehicle battery, the connection between the fuel monitoring device and the fuel tank sensor (and/or the CAN) and the connection between the fuel monitoring device and the battery. Tampering with all of these connections may indicate a fuel theft condition.

Fuel theft often results in damage to the vehicle. For example, it is known for fuel to be stolen from vehicles which are parked overnight. In these cases, thieves typically remove fuel by the quickest method available. Fuel may be rapidly removed from a vehicle by drilling a hole in the fuel tank and draining fuel from the tank. Alternatively, existing ports may be forcibly opened in order to gain access to the fuel in the fuel tank. Consequently, the vehicle fuel tank may become damaged during such fuel theft and the costs incurred by the vehicle operator to repair the vehicle and through loss of use of the vehicle, may greatly exceed the cost of the fuel itself.

Fuel theft prevention devices are known for installation on, or in place of, the fuel filler cap, which prevent access to the fuel tank via the fuel filler, in order to prevent fuel from being siphoned from the fuel tank. Siphoning fuel from a fuel tank via the fuel filler is the easiest method of removing fuel from a fuel tank and is also non-destructive. Thieves not deterred by such anti-siphon devices are therefore encouraged to remove fuel by methods resulting in damage to the vehicle.

The fuel monitoring device of the present invention, operable to detect fuel theft independently of the status of the vehicle CAN, ignition system or battery, obviates the requirement for anti-siphon devices and reduces the likelihood of damage to the vehicle occurring during fuel theft.

It is increasingly common for additional sensors to be positioned within the fuel tank. For example, Wema International (Bergen, Norway) produce units for installation in the fuel tanks of diesel powered goods vehicles which incorporate both fuel tank sensors for measuring fuel level, and urea sensors. Both sensors are connected to the vehicle CAN via a standard 2-pin connector. Other manufacturers adopt alternative types of connectors, however all manufactures of fuel tank sensors in common usage employ simple 2-pin connections of known types. Thus, the fuel monitoring device is connected directly to the fuel tank sensor via a splitter installed in line with the 2-pin connector, the splitter comprising a single female connector and two male connectors, or alternatively, the splitter may comprise two female connectors and a single male connector.

A urea sensor in a fuel tank measures the conductivity of the fuel in order to determine levels of common fuel additives in use with such vehicles. In an alternative embodiment of the present invention (not shown), the fuel monitoring device is advantageously operable to receive analogue data directly (and across the CAN, when the CAN is activated) from both the fuel tank sensor and the conductivity sensor.

It is known for water to be added to a vehicle fuel tanks during, or after fuel theft. If a volume of water added to the tank is equal to the volume of fuel removed, the vehicle operator is typically unaware that fuel theft has occurred, since the vehicle fuel gauge in the vehicle cockpit reports that the level of fluid in the fuel tank is unchanged. Not only does the theft remain undetected for a period of time, but damage may occur to the vehicle's engine if the diluted fuel enters the engine.

A fuel monitoring device operable to receive both fuel level and conductivity data directly from sensors in the fuel tank, may therefore comprise a processor which is programmed to recognise a fuel theft condition comprising a substantial change in fuel conductivity (for example, if water is added to the fuel tank at the same rate that fuel is removed from the fuel tank) and/or a fuel theft condition comprising a drop in fuel level, followed by an increase in fuel level and a substantial change in fuel conductivity (for example if fuel is first removed from the fuel tank and then an equal or similar volume of water added to the fuel tank).

When a fuel theft condition is recognised by the processor, an alarm message is transmitted to an end user. In the example of FIG. 1 fuel level and location information is sent to a computer terminal 27 having a GSM transceiver 29, by the GSM transceiver 11, where it is received by an end user. The fuel level information may comprise qualitative or quantitative data derived from the signals received by the control module from the fuel level sensor, for example information that a fuel level event has occurred. Thus, the end user (which may be a police force, or a vehicle fleet operator) is informed of the time and location of potential fuel theft.

In a preferred embodiment, the fuel monitoring device is operable to receive instructions from the end user across a GSM network, enabling the end user to request real time data and therefore to track the position of the vehicle, for example subsequent to a notification of a fuel theft. The control module may also be operable to perform further functions, by remote instruction from the end user, for example to issue an alarm within the vehicle, or to immobilise the vehicle by changing the ignition status of the vehicle, by issuing appropriate instructions to the vehicle ignition across the CAN. The control module may be pre-programmed to conduct these operations automatically in response to one or more of the fuel theft conditions.

The processor is programmed to evaluate time-averaged signals from the fuel tank sensor, averaged over short time periods, and to compare the time-averaged signals against the one or more fuel theft conditions. For example, the time-averaged signals may comprise the average of readings taken each second (or other suitable time period) for the preceding 30 seconds (or other suitable time period). Thus, short term variations in the signals from the fuel tank sensor resulting from movement of the vehicle, and the consequent movement of fluid within the fuel tank, are distinguishable from variations due to changes in the volume of fluid in the fuel tank.

In an alternative embodiment (not shown) the fuel monitoring device is equipped with a tilt sensor, in order that direct measurements of the orientation of the vehicle may be correlated with changes in the signals from the fuel tank sensor in order to distinguish between changes in the signals resulting from changes in the orientation of the vehicle, from changes resulting from changes in the volume of fluid in the fuel tank.

The fuel monitoring device is also capable of facilitating detection of further forms of fuel theft. In particular, the processor may be operable to calculate total fuel usage by the vehicle, which may be compared to records of fuel purchased for a recording period. Discrepancies between calculated cumulative fuel usage and claimed fuel usage as determined by fuel purchases, exceeding any error in the calculated cumulative fuel usage values, may indicate that fuel has been dispensed into other vessels (for example portable fuel cans or other vehicles) during refuelling of the vehicle. Data recorded on the flash memory device may then be used to provide evidence of the time and location of any fuel theft events. Analysis of cumulative fuel level changes may form one part of an overall fuel audit of a vehicle, or a fleet of vehicles. Data recorded in real-time (i.e. at regular time intervals) comprising fuel level related data, vehicle position related data and data from one or more further sensors connected to the fuel monitoring device across the CAN, for example the vehicle octane sensor and/or the vehicle odometer may be used, for example, to examine performance of the vehicle, or the vehicle when driven by a particular driver, over time in order to identify possible fuel theft events, problems with vehicle performance (such as a degradation in fuel efficiency over time) or to compare fuel usage along alternative routes.

In an alternative embodiment, the fuel monitoring device is able to communicate with a GPS receiver which is integral to a separate vehicle on-board navigation system across the CAN.

FIG. 2 schematically depicts an alternative fuel monitoring device 10 installed within a vehicle (shown generally by the numeral 100). The fuel monitoring device 10 is similar to fuel monitoring device 1 of FIG. 1, however the control module 3 is in communication with a processor 5 having a flash memory device 7 via the GSM transceiver 11 across a GSM network and is in communication with the GSM transceiver across the CAN and receives data from the GPS receiver 9 across the CAN 13. The GSM transceiver may, for example, be the GSM transceiver of a vehicle's hands-free mobile telephone phone communications system and the GPS receiver may, for example be the GPS receiver of a vehicle's satellite navigation system. The processor 5 is typically a computer at a fixed location, for example the business premises of the vehicle's operator. In the present embodiment the fuel monitoring device functions as previously, however data is periodically sent to the processor across the GSM network where it is processed as previously described.

It will be understood that in addition to the examples provided, a fuel monitoring device of the present invention might comprise a data-storage device, such as a Flash memory card or other EEPROM and/or processor located on the vehicle, in addition to recording and processing means located elsewhere.

Figure 3:
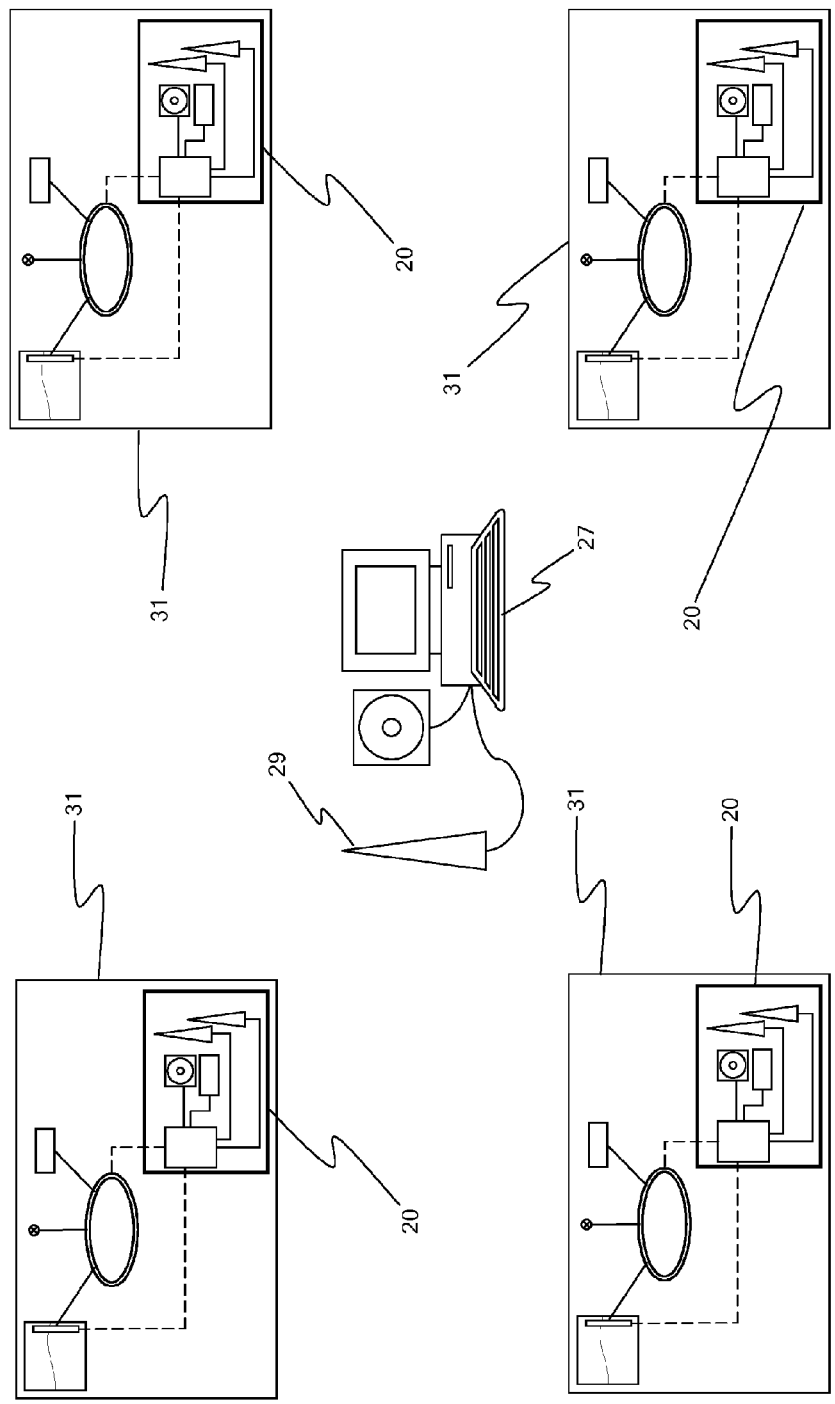
FIG. 3 is a schematic diagram of a fuel monitoring system according to the present invention.

FIG. 3 schematically depicts a fuel monitoring system comprising a plurality of fuel monitoring devices 20 installed on a plurality of vehicles 31, each vehicle having a CAN across which each fuel monitoring device may communicate with the various sensors, as discussed above.

Each fuel monitoring device 20 is operable to periodically, or only in the event of detection of a fuel theft condition, transmit vehicle specific data across a GSM network to an end user. Vehicle monitoring devices 20 may each have their own processors and/or data storage devices and vehicle-specific data may be transmitted to the end user either continuously or only in the event that a fuel theft condition is encountered. Alternatively or additionally, a processor and data storage may be located centrally with the end user, in the form of a computer terminal 27 in connection with a GSM transceiver 29, and unprocessed data transmitted to the end user across a GSM network and processed centrally. Alternatively the central processor may be operable to receive a mixture of processed and unprocessed vehicle specific data from vehicle fuel monitoring devices according to various embodiments of the present invention.

Some or all of the fuel monitoring devices within the fuel monitoring system may also be operable to receive vehicle specific information and execute commands issued by the end user across the GSM network, for example to immobilise pre-selected vehicles having fuel monitoring devices which have previously transmitted data indicating a fuel theft condition.

Some vehicles, for example heavy good vehicles, are equipped with more than one fuel tank. Typically, vehicles having more than one fuel tank are equipped with a main fuel tank and an emergency or backup fuel tank, each having a fuel tank sensor and, in some cases, further sensors located in the fuel tank. The invention extends to a fuel monitoring device having connections directly and/or across the CAN to more than one fuel tank sensor of vehicles having more than one fuel tank sensor.

Further variations and modifications can be made within the scope of the invention herein disclosed.

The invention claimed is:

1. A fuel monitoring device for a vehicle having one or more fuel tank sensors and a Controlled Area Network (CAN) wherein the one or more fuel tank sensors are in communication with the CAN, the fuel monitoring device comprising a control module in communication with the or each fuel tank sensor, wherein the control module is operable to receive data from the or each fuel tank sensor across the CAN when the CAN is activated, and directly from the or each fuel tank sensor when the CAN is deactivated, and operable to output fuel level related data to a mobile communications system transmitter for transmission to an end user.

2. A fuel monitoring device according to claim 1, for a vehicle having an ignition system, the fuel monitoring device operable when the ignition system is off and/or powered up and/or partially powered up.

3. A fuel monitoring device according to claim 1, for a vehicle having at least one battery, operable when the or each battery is connected and/or disconnected and/or charged and/or partially charged and/or discharged.

4. A fuel monitoring device according to claim 1, in direct communication with one or more further vehicle sensors.

5. A fuel monitoring device according to claim 4, in direct communication with the vehicle speed sensor and/or the vehicle odometer.

6. A fuel monitoring device according to claim 4, wherein the control module is operable to receive data from one or more urea sensors located in the or each fuel tank.

7. A fuel monitoring device according to claim 1, wherein data received from the or each fuel tank sensor across the CAN is used to calibrate data received directly from the fuel tank sensor.

8. A fuel monitoring device according to claim 1, wherein the control module is operable to receive data from a vehicle octane sensor across the CAN and is operable to output vehicle octane level related data to a mobile communications system transmitter for transmission to an end user.

9. A fuel monitoring device according to claim 1, operable to output fuel level related data to a mobile communications system transmitter for wireless transmission to a fuel dispensing pump.

10. A fuel monitoring device according to claim 9, operable to output fuel level related data to a mobile communications system transmitter for wireless transmission to a fuel dispensing pump, such that the maximum amount of fuel to be dispensed by the fuel dispensing pump may be limited to the available fuel tank capacity.

11. A fuel monitoring device according to claim 9, comprising a processing module in communication with the control module, the processing module operable to process information received by the control module and create an alarm condition if a fuel theft condition is met, wherein a fuel theft condition comprises comparison of fuel tank related date to with recorded fuel purchases, to thereby detect of fuel theft by the filling of separate fuel tanks during refueling of the vehicle.

12. A fuel monitoring device according to claim 9, further comprising a fuel dispensing pump operable to communicate wirelessly with the control module to receive fuel level related data concerning the vehicle, said fuel dispensing pump comprising a control system for metering the quantity of fuel dispensed, the fuel dispensing pump operable to stop dispensing fuel under one or more of the following circumstances:
  a volume of fuel in excess of the available fuel tank capacity, determined from the fuel level related data has been dispensed;
  the fuel level related data wirelessly received from the fuel monitoring device meets a fuel theft condition; or
the fuel level related data wirelessly received from the fuel monitoring device meets an alarm condition.

13. A fuel monitoring device according to claim 1, comprising a processing module in communication with the control module, wherein the processing module is operable to process information received by the control module and create an alarm condition if a fuel theft condition is met.

14. A fuel monitoring device according to claim 13, wherein a fuel theft condition comprises one or more of:
  a decrease in fuel level when the engine is switched off;
  an increase in fuel level when the octane level decreases;
  a rapid decrease in fuel level when the vehicle is stationary;
  a rapid change in fuel composition;
  a loss of direct communication between the control module and a sensor;
  a loss of direct communication between the control module and the or each fuel tank sensor;
  a loss of communication between the control module and the CAN, when the CAN is activated or between successive periods when the CAN is active;
  a loss of communication between the control module and a sensor across the CAN, when the CAN is activated or between successive periods when the CAN is activated;
  a loss of communication between the control module and the or each battery;
  a decrease in fuel level between successive periods when the CAN is active; and
  dispensing a volume of fuel exceeding the available fuel tank capacity, as calculated from fuel level related data.

15. A fuel monitoring device according to claim 14, further comprising a fuel dispensing pump operable to communicate wirelessly with the control module to receive fuel level related data concerning the vehicle, said fuel dispensing pump comprising a control system for metering the quantity of fuel dispensed, the fuel dispensing pump operable to stop dispensing fuel under one or more of the following circumstances:
  a volume of fuel in excess of the available fuel tank capacity, determined from the fuel level related data has been dispensed;
  the fuel level related data wirelessly received from the fuel monitoring device meets a fuel theft condition; or
  the fuel level related data wirelessly received from the fuel monitoring device meets an alarm condition.

16. A fuel monitoring device according to claim 13, wherein the processing module is operable to determine time averaged fuel level related data and thereby distinguish between variations with fuel level related data over time resulting from motion, rocking or vibrations of the vehicle and a fuel theft condition.

17. A fuel monitoring device for a vehicle according to claim 13, wherein the control module is operable to output an alarm signal in response to an alarm condition of the processing module.

18. A fuel monitoring device according to claim 17, wherein the control module is operable to output the alarm signal to a mobile communications system transmitter for transmission to an end user.

19. A fuel monitoring device according to claim 17, wherein the alarm signal is an audible alarm signal.

20. A fuel monitoring device according to claim 13, wherein the control module is operable to immobilise the vehicle in response to an alarm condition of the processing module.

21. Computer software comprising program code which, when executed on a computing device, causes it to function as a control module of a fuel monitoring device according to claim 1.

22. A fuel monitoring device according to claim 1, further comprising a fuel dispensing pump operable to communicate wirelessly with the control module to receive fuel level related data concerning the vehicle, said fuel dispensing pump comprising a control system for metering the quantity of fuel dispensed, the fuel dispensing pump operable to stop dispensing fuel under one or more of the following circumstances:
  a volume of fuel in excess of the available fuel tank capacity, determined from the fuel level related data has been dispensed;
  the fuel level related data wirelessly received from the fuel monitoring device meets a fuel theft condition; or
  the fuel level related data wirelessly received from the fuel monitoring device meets an alarm condition.

23. A vehicle having one or more fuel tank sensors, a Controlled Area Network (CAN) wherein the or each fuel tank sensor is in communication with the CAN, and a fuel monitoring device, the fuel monitoring device comprising a control module in communication with the or each fuel tank sensor, wherein the control module is operable to receive data from the or each fuel tank sensor across the CAN when the CAN is activated, and directly from the or each fuel tank sensor when the CAN is deactivated, and operable to output fuel level related data to a mobile communications system transmitter for transmission to an end user.

24. A fuel monitoring device according to claim 23, further comprising a fuel dispensing pump operable to communicate wirelessly with the control module to receive fuel level related data concerning the vehicle, said fuel dispensing pump comprising a control system for metering the quantity of fuel dispensed, the fuel dispensing pump operable to stop dispensing fuel under one or more of the following circumstances:
    a volume of fuel in excess of the available fuel tank capacity, determined from the fuel level related data has been dispensed;
    the fuel level related data wirelessly received from the fuel monitoring device meets a fuel theft condition; or
    the fuel level related data wirelessly received from the fuel monitoring device meets an alarm condition.

* * * * *